Figure 1:
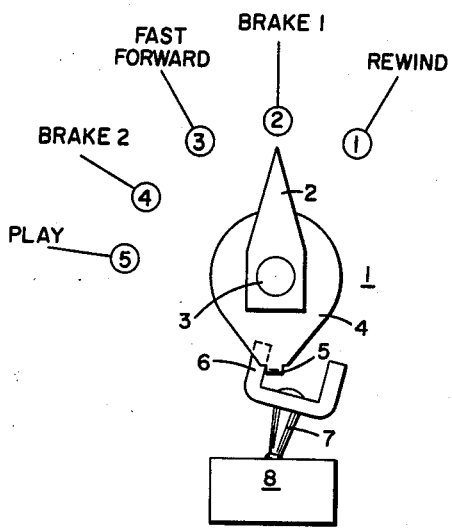

Feb. 2, 1960 J. W. GRATIAN ET AL 2,923,488
WINDING AND REELING CONTROL SYSTEM
Filed Oct. 8, 1956 2 Sheets-Sheet 1

INVENTORS.
J. W. GRATIAN
R. J. O'BRIEN
BY
ATTORNEY

INVENTORS.
J. W. GRATIAN
R. J. O'BRIEN
BY
ATTORNEY

United States Patent Office 2,923,488
Patented Feb. 2, 1960

2,923,488

WINDING AND REELING CONTROL SYSTEM

Joseph W. Gratian and Richard J. O'Brien, Rochester, N.Y., assignors to General Dynamics Corporation, Rochester, N.Y., a corporation of Delaware Application October 8, 1956, Serial No. 614,520

9 Claims. (Cl. 242—55.12)

Our invention relates to reversible reeling systems, and more particularly to an improved braking control system for use with a reversible reeling system.

In the magnetic recording field utilizing magnetic tapes or wires, reversible reeling systems are used to control the passing of the recording medium past the read and write heads of the recording device. In order to stop the movement of the tape at desired positions, the systems have various braking devices. These braking devices fall into two general categories; one being a mechanical braking system utilizing friction brakes, and the other being an electro-dynamic braking system. The mechanical braking system utilizes a friction brake arrangement on the shafts of both drive motors, while the electro-dynamic braking system may operate by applying equal D.C. pulses to both A.C. induction drive motors.

In such systems of the prior art, braking is accomplished by braking both the forward and the rewind motors simultaneously, regardless of the direction that the recording medium is traveling when the control switch is indexed to the brake position. These systems utilizing simultaneous braking of both drive motors, and consequently the reels, have the disadvantage that such operation results in tape spillage or pile-up. This situation results from unbalance in the effectiveness of each brake and also the amount of tape and the size of reel coupled to each motor. Unless the brakes are equally balanced, one brake will be more effective, and consequently, one reel will stop before the other. When the brake of the pay-out motor is more effective than that of the pick-up motor, there is no tape spillage or pile-up, since its brake aids in bringing to a halt the pick-up reel through the tension applied to the pick-up reel by the recording medium itself. On the other hand, if the brake of the pick-up reel is more effective, it will stop the pick-up reel before the brake of the pay-out reel has stopped, consequently resulting in tape pile-up. Even when you assume that each brake is equally effective in stopping reels of equal mass while rotating at an equal angular velocity, the system still can be subject to tape pile-up, since the difference in size of reels and the amount of tape on each reel will enter into the picture, and result in varying degrees of unbalance.

Consequently, it would be desirable to have a braking system which was not subject to tape pile-up due to unbalance in the system.

It is accordingly an object of our invention to provide a braking system for a reversible reeling system which is free of tape pile-up due to unbalance in the system.

It is a further object of our invention to provide a selective braking system for a reversible reeling system which is free of the problems of tape pile-up.

It is a further object of our invention to provide a reversible reeling system having a braking arrangement in which the brakes on the drive motors are selectively energized in accordance with the direction of rotation of the system.

It is another object of our invention to provide a reversible reeling system having a control device for the selective energization of reel braking means in which the control device has a common brake position and automatically energizes the correct reel braking means upon moving said control device to the common brake position.

According to our invention, a reversible reeling system can be provided with a control device having three positions, the first being to control the driving of the system in one direction and the second being to control the driving of the system in the reverse direction, while the third position, which is interposed between the other two positions, serves to energize a selected braking device. The system utilizes two braking devices, one for braking the system when traveling in one direction, and the other to brake the system traveling in the other direction. In order to select a braking device, there is provided a two position selecting switch which determines which one of the two braking devices will be energized when the control device is moved to the third or common position. This selecting switch is operated to one of its positions in response to the movement of the control device to one of the control device's two positions, while it will be operated to its other position in response to the movement of the control device to the other of the control device's first two positions. Since the selecting switch is not actuated from one position to another upon movement of the control device from either position to its third position, it will remain in a position indicative of its setting prior to movement to the third or common brake position.

Figure 2:
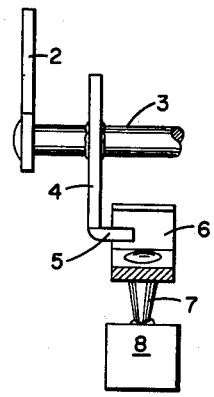
Figure 3:
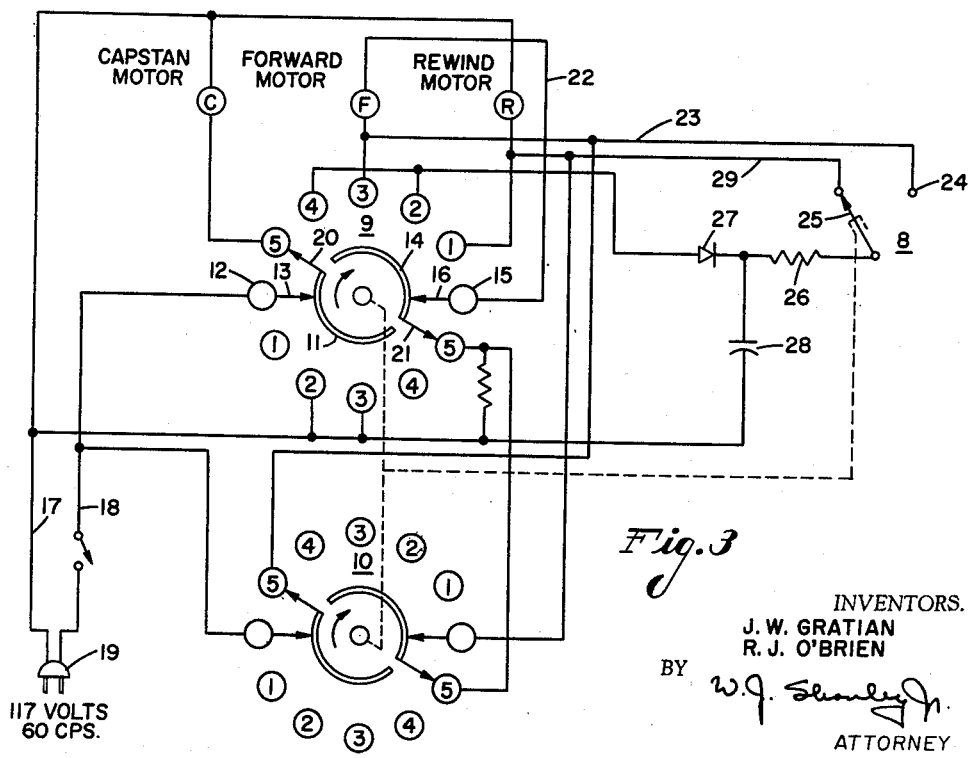
Figure 4A:
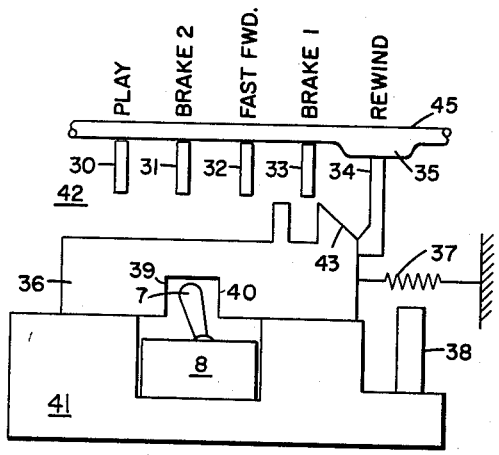
Figure 4B:
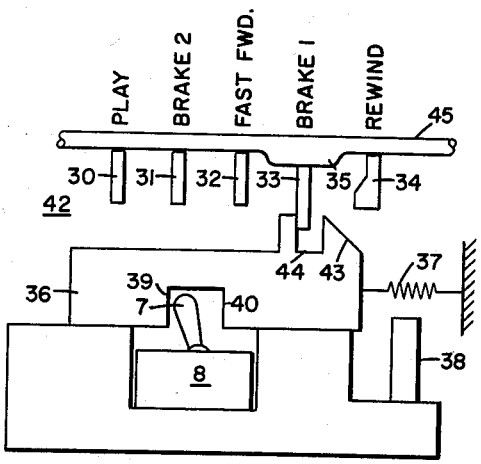
Figure 4C:
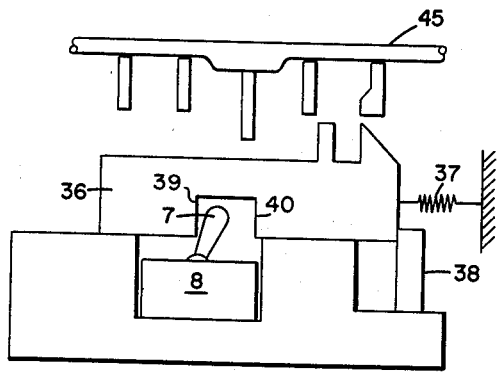
Figure 4D:
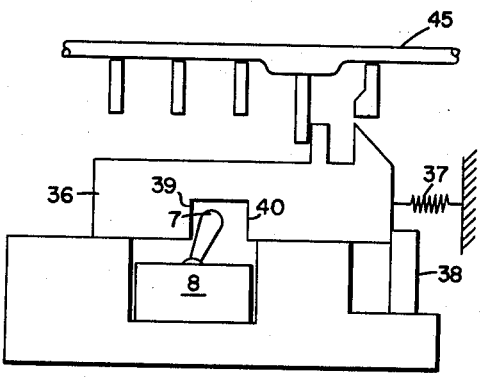
Figure 5A:
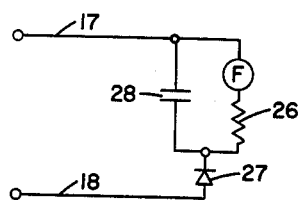
Figure 5B:
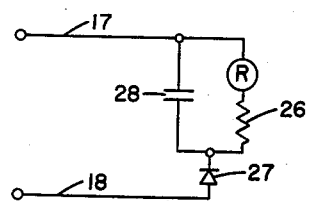

Further objects and advantages of our invention will become apparent as the following description proceeds, and the features of novelty which characterize our invention will be pointed out with particularity in the claims annexed to and forming a part of this specification. For a better understanding of our invention, reference may be had to the accompanying drawings, of which:

Figs. 1 and 2 are front and side elevations, respectively, of one embodiment of the control switch for actuating the improved braking system, Fig. 3 is a schematic diagram of the manner that the control switch of Fig. 1 is incorporated in the braking system forming the subject matter of this application, Figs. 4a–4d are elevational views of another embodiment of a control switch shown in different positions for actuating the braking system disclosed, and Figs. 5a and 5b are schematic diagrams of the two braking circuits set up by a common position of either control switches, the particular circuit selected depending upon the order of operation of the control switch.

Referring now to Fig. 1 of the drawings, there is illustrated a conventional rotary wafer switch indicated generally at 1. The switch is provided with a shaft position indicator and control knob 2, mounted on a shaft, 3. Attached to shaft 3 is cam 4, having a finger 5 normal to the plane of cam 4. Finger 5 protrudes into the U-shaped member 6 attached to end 7 of toggle switch 8. Rotary switch 1 is a five-position wafer switch containing two gangs of contacts. The five positions are numbered 1 to 5 and are labeled according to their functions. The function and the particular arrangement of the contacts of switch 1 will be explained in detail hereinafter when discussing Fig. 3.

Fig. 2 is a partial section view of Fig. 1 for the purpose of illustrating the action of finger 5 of cam 4 and U-shaped member 6 of switch 8. From Fig. 2, it can be seen that member 6 is situated behind cam 4 and is operated by finger 5 of cam 4 upon the rotary switch being moved in a prescribed manner. Finger 5 and member 6 are so situated with respect to each other that switch 1 may be moved from brake position 2 through the fast forward and brake positions to the play position 5 and back to brake position 2 without having finger 5 move switch 8 from its illustrated position. However, the moving of switch 1 from the brake position 2 to the rewind position 1 will cause finger 5 to move switch 8 from the position illustrated in Fig. 1 to a second position. Thereafter, switch 1 may be moved back and fourth between the rewind and brake position 2 without actuating switch 8. On the other hand, if switch 1 is moved from brake position 2 to fast forward position 3, switch 8 will be returned to its original position. It may be therefore seen that switch 1 may be moved between brake position 2 and fast forward position 3, without actuating switch 8 from its indicated position, while switch 1 may be moved between rewind position 1, and the brake position 2, without actuating switch 8 from a position opposite to the illustrated position in Fig. 1. Therefore, it may be seen that the common position, that is, brake position 2, can be used to set up two different circuits in accordance with the two different positions possible for switch 8 due to the action of the cam 4 and associated finger 5 with the U-shaped member 6 of toggle 7. The particular position that switch 8 will assume when the control switch 1 is in position 2 will depend upon the position from which switch 1 last moved. Therefore, it may be considered that toggle switch 8 acts as a memory, since its positions while control switch 1 is in the brake position 2 will be indicative of the position from which the switch came when moved to position 2.

In Fig. 3 of the drawings, there is illustrated schematically a reversible reeling system controlled by wafer switch 1 in conjunction with toggle switch 8. Switch 1 has two gangs of contacts, the upper set of contacts of gang 9 being numbered 1–5, are associated with shorting bar 11 which serves to conect terminal 12 through slider 13 and its associated arm 20 to the selected numbered contact. It will be noted that shorting bar 14 is associated with the lower set of numbered contacts of bank 9, and serves to interconnect terminal 15 with the selected numbered terminal through slider 16, shorting bar 14 and its associated arm 21. The sets of contacts comprising gang 10 are identical with the contacts of gang 9, and consequently will not be discussed in detail.

Toggle switch 8 is shown in a position corresponding with the illustrated position of Fig. 1. This position will hereinafter be referred to as the fast forward brake position, and the opposite position will be called the rewind brake position.

When selector switch 1 is in rewind position 1, rewind motor R is connected directly across the line between conductors 17 and 18 which are connected to a conventional source of A.C. power through plug 19. This energizing circuit is traced from conductor 17 through rewind motor R to contact No. 1 of the upper set of contacts of gang 9 through arm 20, shorting bar 11, slider 13, terminal 12 and back to conductor 18. It can be therefore seen that when selector switch 1 is thrown to rewind position 1, the rewind motor is energized by the full A.C. voltage appearing between conductors 17 and 18. Therefore, the system is rotated in the rewind direction at full speed when control switch 1 is indexed to rewind position 1.

When selector switch 1 is indexed to position 2, that is, the common brake position, after having been in rewind position 1, the switch will energize forward motor F with a pulsating D.C. which will tend to bring the motor and the system to a halt. This circuit is traced from conductor 17 through; contact 2 of the lower set of contacts of gang 9, arm 21, shorting bar 14, slider 16, terminal 15, conductor 22 forward motor F, conductor 23 to contact 24 of switch 8. Contact 24 of switch 8 is connected to the movable arm 25, thence through resistance 26, diode 27, and contact 2 of the upper set of contacts of the gang 9, arm 20, shorting bar 11, slider 13, terminal 12, and thence back to the other side of the supply through conductor 18. Diode 27 serves to rectify the A.C. voltage applied to conductors 17 and 18 and resistance 26 limits the rectified D.C. to such a value as to effect proper braking of forward motor F selected by switch 8. Capacitor 28 which is connected between the junction of resistance 26 and diode 27 and conductor 17 of the power supply is connected across forward motor F and resistance 26 to serve as a filtering condenser to smooth the D.C. voltage applied to the forward motor. Therefore, the voltage applied to forward motor F is a pulsating D.C. which decelerates and brings the motor to a stop, since it is an A.C. induction motor. Rewind motor R and capstan motor C are also A.C. induction type motors.

When selector switch 1 is indexed to fast forward position 3, it connects the forward motor F directly across conductor 17 and 18 through the No. 3 contacts of both the upper and lower set of gang 9. This circuit is traced through conductor 17, contact 3 of the lower set of contacts of gang 9, arm 21, shorting bar 14, slider 16, terminal 15, conductor 22, forward motor F, contact 3 of the upper set of gang 9, through the switch to terminal 12 and back to conductor 18. Therefore, when selector switch 1 is indexed to its No. 3 position or its fast forward position, forward motor F is connected directly across the line and has the full A.C. voltage applied thereto. Consequently, forward motor F rotates at full speed thereby moving the system in a forward direction at full speed when control switch 1 is indexed to its No. 3 position.

When selector switch 1 is indexed from position 2 to fast forward position 3 while toggle switch 8 is in rewind brake position, the toggle is operated to the fast forward brake position as described hereinbefore, thereby connecting arm 25 to conductor 29 which is connected to the junction of the rewind motor R and contact 1 of the upper set of gang 9. The change in circuitry occasioned by the switching of toggle 8 from its rewind to fast forward brake position is not effective when the selector switch is in fast forward position 3. Such switching serves to select a braking circuit which will only become energized upon the moving of control switch 1 to either brake position 2 or 4 from position 3.

When selector 1 is moved back to the common brake position 2 from fast forward position 3, rewind motor R is connected in series with resistance 26 through diode 27, back to the other side of the line. In parallel with rewind motor R and resistance 26 is filter capacitor 28. This circuit may be traced from diode 27 through contact 2 of the upper set of gang 9, arm 20, shorting bar 11, slider 13, terminal 12 to conductor 18. It may thus be seen that a pulsating D.C. is applied to the rewind motor when toggle switch 8 is in the fast forward brake position and the control switch is in position 2. It is also noted that the same circuit would be energized if control switch 1 is moved from position 3 to 4 instead of back to brake position 2, since contacts 2 and 4 of the upper set of contacts of gang 9 are paralleled, thereby setting up the same circuit. It may thus be seen that due to the action of selector switch 1 and toggle switch 8, two separate braking circuits are energized from the common position, that is, brake position 2 of switch 1, the particular braking circuit being energized depending upon the position from which the selector switch was last moved.

Fig. 5a illustrates the circuit set up by selector switch 1 being in the No. 2 position, and the toggle switch 8 being in the rewind brake position, while Fig. 5b illustrates the circuit set up with selector switch 1 in the No. 2 position and the toggle switch 8 being in the fast forward brake position. The elements in Figs. 5a and 5b bear the same reference numeral as their corresponding elements in Fig. 3. It will be noticed that both braking circuits are effective by pulsing the pay-out motor so that no tape spillage or pile-up can occur in accordance with this invention.

When selector switch 1 is set in its fourth position, that is, the brake position, it sets up the fast forward brake since toggle switch 8 will remain in the fast forward braking position upon the selector switch being switched from position 3 to 4. Therefore, the circuit set up would be identical with the circuit of Fig. 5b. That is, the rewind motor can be pulsed so as to brake the system prior to its being thrown into the fifth position, that is, the play position.

Fig. 4 illustrates a slide bar actuated type of switch that can be substituted for the rotary wafer switch in the schematic diagram of Fig. 3. Slider bar 45 controls the positions of rods 30, 31, 32, 33, and 34 in accordance with its own position. All the rods are spring urged against the control surface of bar 45. Bar 45 has a raised portion 35 which serves to move one of the control rods from its normal position to an actuated condition in which the contacts mounted on the subject rod are operated. The positioning of the control rods serves to control the movement of sliding cam 36 which in turn controls the position of toggle 8. Sliding cam 36 is under tension due to spring 37 and will be actuated to a position against stop 38 when neither rod 33 nor 34 are actuated. The toggle portion 7 of switch 8 is operated by surfaces 39 and 40 of a cut-out portion of cam 36, while the base of switch 8 is set in a notch in base member 41 of the switch.

It will be obvious to those skilled in the art that rods 30 to 34 may be made to actuate contacts which will perform the same function as the contacts of the two gangs of rotary switch 1. It is also apparent that bar 45 will have to have five detent positions which correspond with the positioning of the five rods opposite the raised portion 35 of the bar, so as to assure accurate positioning. Switch 42 will be said to be in a position corresponding with the designation applied to the rod actuated. These positions are: Rewind, Brake 1, Fast Forward, Brake 2, and Play. The detents are not shown since their exact configuration forms no part of this invention. Detents are well-known in the prior art, and providing detents for rod 45 is certainly within the skill of a person skilled in the art.

Fig. 4a illustrates the position switch 42 and switch 8 when the slide bar is actuated to the rewind position. In this position, bar 34 is in its actuated condition, thereby forcing sliding cam 36 away from stop 38 due to the action of bar 34 bearing on surface 43. If toggle 8 happened to be in the position illustrated in Fig. 4a prior to the actuation of the rewind bar 34, then the movement of the control bar to the rewind position would not affect the position of switch 8. On the other hand, if switch 8 was in the other position, the operation of bar 34 to its illustrated position would serve to actuate switch 8. The position of switch 8 that is illustrated is its rewind brake position.

Fig. 4b illustrates the physical positioning of the elements of switch 42 when bar 45 is actuated to the second position, that is, the brake position. When bar 45 is moved from the rewind toward the brake position, bar 33 will be operated into the notch 44 before bar 34 has released cam 36. In this way, rod 33 will catch the sliding cam before it encounters stop 38.

The relative positioning and sizes of the bars and notch 44 and the notch in the lower surface of sliding cam 36 are so positioned that the travel of the cam is not sufficient to actuate switch 8 when the bar is actuated from Rewind to its Brake 1 position, nor is it sufficient to actuate switch 8 from its fast forward brake position when switch 42 is changed back and forth between Fast Forward and Brake 1.

When the bar is further actuated from the Brake 1 position toward the Fast Forward position, cam 36 is released from its Brake 1 position and due to the action of spring 37, moves until it encounters stop 38. This position is illustrated in Fig. 4c. When sliding cam 36 moved from its Brake 1 position to the third position, or the Fast Forward position, it is noted that surface 40 of cam 36 actuated toggle switch 8 from its position illustrated in Fig. 4b to that position illustrated in Fig. 4c. By so doing, cam 36 is preparing an energizing circuit for the fast forward brake which will be energized upon moving control bar 45 to either the Brake 1 or Brake 2 position. The result of moving switch 42 from the Fast Forward back to the Brake 1 position is illustrated in Fig. 4d in which the control bar has been returned from the Fast Forward position to the Brake 1 position, thereby energizing the brake circuit selected by the position of toggle switch 8.

It is therefore apparent that the control switches illustrated in Figs. 1 and 4 have a fast forward and a rewind position, plus an interposed brake position which energizes a selected braking circuit. One of the two possible braking circuits is selected in accordance with the position of selecting switch 8 which is responsive to predetermined movement of the control switch. The predetermined movement is such that the braking circuit selected is always effective to brake the pay-out motor when the control switch is indexed to the interposed brake position from either the Fast Forward or the Rewind positions.

The switches of Figs. 1 and 4 also are so arranged that in order to change the direction or speed at which the tape is moving by moving the control switch, you must pass through an interposed brake position which will automatically serve to brake the system, thereby preventing any undue strain on the reeling system itself or the flexible medium being transported by reversing the direction of movement of the system from one full speed position to another without braking the system.

While we have shown and described specific embodiments of our invention, other modifications will readily occur to those skilled in the art. We do not, therefore, desire our invention to be limited to the specific arrangements shown or described, and we intend in the appended claims to cover all modifications within the spirit and scope of our invention.

We claim:

1. In a reversible reeling system, first means for driving said system in one direction at a given speed, second means for driving said system in the reverse direction, third means for driving said system in said one direction at a speed less than said given speed, first means for braking said system when moving in said one direction, second means for braking said system when moving in said reverse direction, control means having a first, second and third condition of operation for respectively operating said first, second and third driving means, said control means having fourth and fifth conditions for enabling the operation of a selected one of said first or second braking means, selecting means having first and second conditions for respectively selecting said first and second braking means for operation when enabled by said control means, said fourth and fifth conditions being conditions at least one of which the control means must assume in changing between any two of said first, second and third conditions, and means for operating said selecting means between said first and second conditions in response to the changing of said control means between said first and said second conditions thereof.

2. In a reversible reeling system, first means for driving the system in one direction at a given speed, second means for driving the system in the opposite direction, multiposition control means, means for energizing said second driving means in response to said control means assuming a first position, means for energizing said first driving means in response to said control means assuming a second position, means for energizing both said first and second drive means in such a manner as to drive said system in said one direction at a speed less than said given speed when said control switch assumes a third position, means for selecting said first driving means for energization when said selecting means assumes a first condition, said selecting means having a second condition for selecting said second driving means for energization, means for energizing the selected driving means so as to cause it to operate as a brake upon the system when said control means assumes a fourth position, and means for causing said selecting means to assume said first condition in response to the moving of said control means from said first to said second position, said latter means being responsive to the moving of said control means from said second to said first position for causing said selective means to assume said second condition.

3. In a reversible reeling system, first means for driving the system in one direction at a given speed, second means for driving the system in the opposite direction, multiposition control means, means for energizing said second driving means in response to said control means assuming a first position, means for energizing said first driving means in response to said control means assuming a second position, means for energizing both said first and second drive means in such a manner as to drive said system in said one direction at a speed less than said given speed when said control switch assumes a third position, means for selecting said first driving means for energization when said selecting means assumes a first condition, said selecting means having a second condition for selecting said second driving means for energization, means for energizing the selected driving means so as to cause it to operate as a brake upon the system when said control means assumes a fourth position, and means for causing said selecting means to assume said first condition in response to the moving of said control means from said first to said second position, said latter means being responsive to the moving of said control means from said second to said first position for causing said selective means to assume said second condition and being ineffective to cause said selecting means to change from one condition to another in response to the movement of said control means from said fourth position back to either said first or second position, the particular position being the position to which it was set immediately prior to its setting to said fourth position.

4. In a reversible reeling system, first means for driving the system in one direction at a given speed, second means for driving the system in the opposite direction, multiposition control means, means for energizing said second driving means in response to said control means assuming a first position, means for energizing said first driving means in response to said control means assuming a second position, means for energizing both said first and second drive means in such a manner as to drive said system in said one direction at a speed less than said given speed when said control switch assumes a third position, means for selecting said first driving means for energization when said selecting means assumes a first condition, said selecting means having a second condition for selecting said second driving means for energization, means for energizing the selected driving means so as to cause it to operate as a brake upon the system when said control means assumes a fourth position, and means for causing said selecting means to assume said first condition in response to the moving of said control means from said first to said second position, said latter means being responsive to the moving of said control means from said second to said first position for causing said selective means to assume said second condition, said fourth position being a position through which said control means must pass during each change of position between its first and second positions whereby said first and second driving means are selectively energized to operate as braking devices during each change in the direction of movement of said system.

5. In a reversible reeling system, first means for driving the system in one direction at a given speed, second means for driving the system in the opposite direction, multiposition control means, means for energizing said second driving means in response to said control means assuming a first position, means for energizing said first driving means in response to said control means assuming a second position, means for energizing both said first and second drive means in such a manner as to drive said system in said one direction at a speed less than said given speed when said control switch assumes a third position, means for selecting said first driving means for energization when said selecting means assumes a first condition, said selecting means having a second condition for selecting said second driving means for energization, means for energizing the selected driving means so as to cause it to operate as a brake upon the system when said control means assumes a fourth position, and means for causing said selecting means to assume said first condition in response to the moving of said control means from said first to said second position, said latter means being responsive to the moving of said control means from said second to said first position for causing said selective means to assume said second condition and being nonresponsive to a change of said control means from said second to said fourth position, said third position being a position through which said control means must pass during each change of position between said first and second positions.

6. The combination of claim 2 in which said first and second driving means includes first and second motors, said means for energizing said first and second motors includes a source of voltage which is respectively applied to said first and second motors when said control means assumes said second and first positions.

7. The combination of claim 6 in which said motors are A.C. motors, said source of voltage is an A.C. source, said selecting means includes a manually operable switch which selectively prepares an energizing path for said first or said second motor, and said means for energizing said selected motor including means for rectifying said A.C. voltage and applying the rectified voltage to said selected motor when said control means assumes said fourth position.

8. The combination of claim 7 in which said means for causing said selecting switch to be responsive to movement of said control means includes a mechanical linkage between said control means and said selecting switch.

9. The combination of claim 2 in which said control means has a fifth position wherein the selected driving means may be energized to cause said selected driving means to operate as a brake upon the system, said fifth position being a position through which said control means must pass during each change of position from said second to said third position, and said causing means being ineffective to change said selecting means from its first condition when said control means changes from said second to said third position.

References Cited in the file of this patent

UNITED STATES PATENTS

| 2,712,448 | Schroter | July 5, 1955 |
| 2,768,244 | Tiger | Oct. 23, 1956 |
| 2,775,407 | Elliott et al. | Dec. 25, 1956 |

Notice of Adverse Decision in Interference

In Interference No. 92,029 involving Patent No. 2,923,488, J. W. Gratian and R. J. O'Brien, Winding and reeling control system, final judgment adverse to the patentees was rendered Oct. 23, 1963, as to claims 2, 4, and 6.

[*Official Gazette December 22, 1964.*]